United States Patent
Powers

(10) Patent No.: US 6,197,087 B1
(45) Date of Patent: *Mar. 6, 2001

(54) PYROLYSIS OF HALOGENATED ORGANIC HAZARDOUS WASTES WITH DIRECT REDUCTION OF IRON OXIDES

(76) Inventor: James M. Powers, 3 Santa Lucia Ave., Ormond Beach, FL (US) 32174

( * ) Notice: Subject to any disclaimer, the term of this patent is extended or adjusted under 35 U.S.C. 154(b) by 0 days.

This patent is subject to a terminal disclaimer.

(21) Appl. No.: 09/169,857

(22) Filed: Oct. 10, 1998

Related U.S. Application Data

(63) Continuation of application No. 08/790,527, filed on Jan. 29, 1997, now Pat. No. 5,824,134.

(51) Int. Cl.$^7$ ................................................. C21B 13/04
(52) U.S. Cl. ................... 75/473; 75/505; 75/670; 75/961; 588/206; 588/215; 588/220; 588/223; 423/439
(58) Field of Search .................. 75/473, 505, 670, 75/961; 588/206, 215, 220, 223; 423/439

(56) References Cited

U.S. PATENT DOCUMENTS

| | | |
|---|---|---|
| Re. 32,247 | 9/1986 | Stevens ........................... 75/11 |
| 4,834,792 | 5/1989 | Becerra-Novoa ................ 75/35 |
| 5,244,490 | 9/1993 | Agarwal ........................ 75/500 |
| 5,425,989 | 6/1995 | Bishop ......................... 48/197 |
| 5,824,134 | * 10/1998 | Powers ........................ 75/473 |

FOREIGN PATENT DOCUMENTS

| | | | |
|---|---|---|---|
| 2841039 | 4/1980 | (DE) | .............................. 588/206 |

* cited by examiner

Primary Examiner—Melvyn Andrews

(57) ABSTRACT

Disposal of halogenated organic hazardous wastes by introducing them as feedstocks in the direct reduction of iron oxide (DRI). (DRI is described in Pat. RE.32247.) The novel hydrocarbons used as reducing feedstocks would normally be destined to become hazardous wastes or else their products of decomposition would be hazardous wastes. Such hydrocarbons are inclusive of but not limited to halogenated hydrocarbons such as PVC, PCBs, various insecticides, dioxin and others. This category of hydrocarbon wastes is otherwise difficult to utilize, incinerate, or otherwise dispose of safely. Polluting byproducts such as dioxin are almost always released. However within a DRI reactor they can be disposed of safely. There is no stack or vent to atmosphere. These hydrocarbons would be used as an alternative to or admixture with the usual hydrocarbon feedstocks of choice, methane or related short chain hydrocarbons.

4 Claims, 1 Drawing Sheet

PYROLYSIS OF HALOGENATED ORGANIC HAZARDOUS WASTES WITH DIRECT REDUCTION OF IRON OXIDES

CROSS REFERENCES TO RELATED APPLICATIONS

This is a continuation in part of patent application Ser. No. 08/790,527, filed on Jan. 29, 1997issued as U.S. Pat. No. 5,824,134 which teaches refining of iron oxide utilizing products of decomposition of organic hazardous wastes with polluting fractions selected from a group consisting of organic phosphates, organic sulfurs, organic nitrogens, or organic mercury or tin.

BACKGROUND

1. Field of Invention

This invention involves decomposition of halogenated organic hazardous waste materials into inorganic molecules. The wastes are pyrolized/cracked/reformed and reacted with iron oxide in a closed, heated, pressurized Direct Reduction of Iron Oxide (DRI) process.

2. Description of Prior Art

Direct Reduction of Iron oxide to iron and carburization of that iron to iron carbide has been described in Pat. Re. 32247. Methane is the hydrocarbon of choice for this process although use of related short chain hydrocarbons has been postulated.

This is a continuation in part of patent application Ser. No. 08/790,527 issued as U.S. Pat. No. 5,824,134 which teaches decomposition of organic hazardous wastes with polluting fractions selected tom a group consisting of organic phosphates, organic sulfurs, organic nitrogens, or organic mercury or tin.

Pat. U.S. No. 5,425,792 proposed producing syngas by reforming auto shredder and other industrial wastes under high heat in a rotary kiln. Pat. U.S. No. 5,244,490 proposed waste polymer materials as part of the fuel charge in iron melting blast furnaces. Both processes are done at temperatures in excess of 2000 degrees C. and not under the pressures customary in a closed pressurized DRI reactor. They vent products of decomposition to the atmosphere.

Pat. U.S. No. 4,834,792 teaches adding excess methane to DRI reactors to partially carburize sponge iron to make it less pyrophoric during handling.

German Patent 2841039 apparently teaches the test tube scale reduction of metal oxides using Trichlorofluromethane (CFCL3) reagent as a versatile, low temperature reducing agent. The present invention is for commercial scale safe disposal and reuse of halogenated organic waste materials.

OBJECTS AND ADVANTAGES

Accordingly, several objects and advantages of my invention are:

It provides a significant source of added revenue to the operators of a Direct Reduction of Iron Oxide reactor because the novel hydrocarbons used as feedstocks would normally be destined to become hazardous wastes or else their products of decomposition would be hazardous wastes for which disposal is difficult, environmentally hazardous and expensive.

Suppliers of such feedstocks would pay dearly to a DRI processor to accept and consume as feedstock organic hazardous wastes containing organic phosphorous, organic sulfurs, organic nitrogens, organic mercury, or organic tin but including halogenated hydrocarbons. These materials are difficult and expensive to incinerate or otherwise dispose of safely for polluting discharges are almost always released.

A DRI as hazardous feedstock reactor has the advantage that it would require much lower net energy and temperature than any of various hazardous waste incinerators and is closed, pressurized and therefore environmentally safer.

Carbon is not wasted up a stack as polluting $CO_2$, but is incorporated and shipped with the iron as iron carbide.

The reactor is essentially a closed pressurized reactor with no polluting stack.

The reaction products are liquid water solid iron, solid iron carbide, may include free tin, free mercury and/or inorganic acid gases. Of said products, resulting water and inorganic remnants of polluting fractions which are scrubbed from the reducing carburizing atmosphere.

The catalysts that helps crack the hazardous waste molecules do not have to be decarburized as does y-zeolite catalyst in petroleum cat crackers since the carburized iron compounds functioning as cracking catalyst in the fluidized bed (or other DRI reactor) are shipped as the end product.

Still further objects and advantages will become apparent from a consideration of the ensuing description and accompanying drawings.

SUMMARY

This process disposes of organic hazardous materials by breaking them down into carbon, hydrogen and inorganic forms of the polluting fractions of the beginning organic materials. Waste hydrocarbons with associated polluting fractions are pyrolyzed/cracked/reformed into progressively smaller carbon chains and into $CH_4$, CO, $CO_2$, $H_2O$, $H_2$ and polluting fractions in the reaction zone of the fluidized bed (or other DRI reactor) containing iron oxide. The CO and $H_2$ are required to reduce the iron oxide and the $CH_4$, and CO carburize the metallic iron. The water along with polluting fractions; possibly phosphates, sulfates, nitrates, or heavy metals such as mercury or tin but specifically including acid gases of halogens, can be continuously scrubbed from the reducing gases by limestone admixed in the iron oxide feedstock, water scrubber in water solution, or in ion scrubbers added for that purpose.

These feedstocks might otherwise be destined to be hazardous waste materials. These materials are difficult to incinerate or otherwise dispose of safely. Polluting byproducts are almost always released. However in this invention the reducing atmosphere is partially scrubbed of unwanted remnants of pyrolysis; soluble and condensed acid gases with condensed water vapor in the direct reduction water scrubbers. The reaction products in such a DRI reactor are inorganic, collectable, and safely reusable or disposable. Suppliers of such feedstocks would pay dearly to provide such hydrocarbons to a DRI processor to save disposal costs. This would add to that processors revenues and avoid the need to purchase some or all the usual methane feedstock.

REFERENCE NUMERALS

Figure 1:
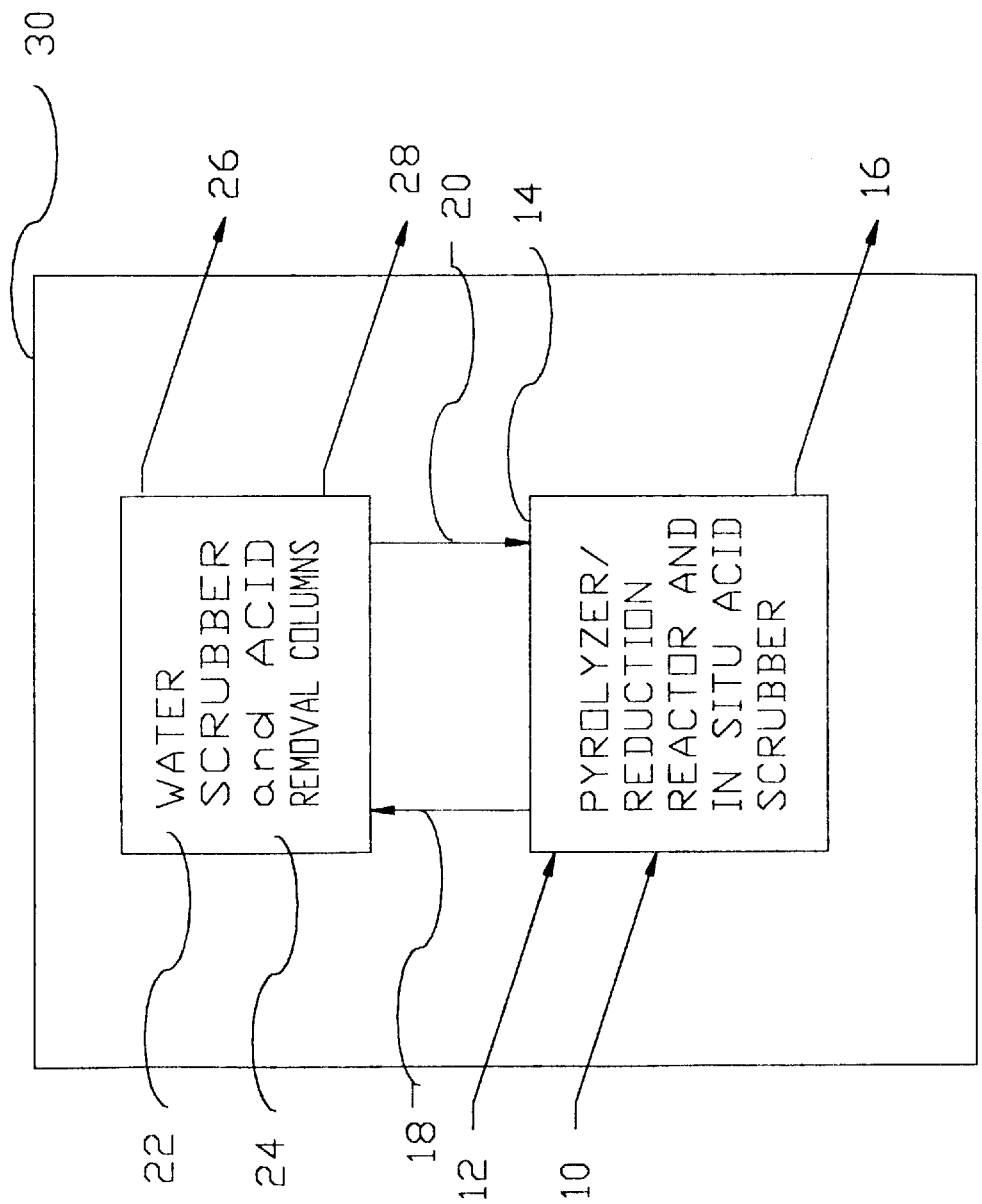
FIG. 1 shows a block diagram of a DRI process indicating mixed hydrocarbon feedstock and enhanced scrubbing.

10 mixed hydrocarbon feedstock; would-be wastes plus optional methane 12 iron oxide feedstock with crushed limestone admixture 14 Main Reactor 16 iron carbide product 18 wet reducing(carburizing gases and polluting fractions 20 reducing/carburizing gases with polluting fractions and water removed 22 scrubber designed for more corrosive gases 24 ion columns supplanting condensed water solutions for removing pollutants 26 contaminant/water solution discharge 28 discharge from columns 30 surrounding pressure vessel

PREFERRED EMBODIMENT

Hydrocarbons with associated polluting fractions 10 (mixed with or without the usual methane) are pyrolyzed/cracked/reformed progressively into hot $CH_4$, $CO$, $CO_2$, $H_2$, and $H_2O$ mixed with polluting fractions 18 within the reaction zone (Main Reactor) 14 a fluidized bed (or other DRI reactor) of iron oxide. The CO and $H_2$ 20 reduce the iron oxide 12 when it enters the reactor and the $CH_4$ and CO 20 carburize the metallic iron into iron carbide product 16. Polluting fractions are also cracked from the hydrocarbons with associated polluting fractions. Such materials including halogens, phosphates, sulfates, nitrates, and heavy metals can be continuously scrubbed in situ by limestone 12 admixed with iron oxide, scrubbed 22 from the reducing gases in water solution 26 and/or in ion scrubbers 24 and 28 added for that purpose. All reactions are confined to the surrounding pressure vessel 30.

CONCLUSIONS, RAMIFICATIONS, AND SCOPE

Accordingly, it can be seen that I have provided a closed and clean method of decomposing halogenated organic hazardous wastes into manageable inorganics that is clearly environmentally safer than open methods like fuel blending or incineration. Inorganic halogen acid gas ions can be scrubbed to be reused or tied up as safe salts (such as CaCl2) that can be properly disposed.

Although the description above contains many specificities, these should not be construed as limiting the scope of the invention but as merely providing illustrations of some of the presently preferred embodiments of this invention. Various other embodiments and ramifications are possible within it's scope. For example products of decomposition of medical hazardous wastes include organic hazardous materials, in fact are a major dioxin source. By this process such materials are converted to more docile inorganic materials. Plastic wastes or tires, could also be used as organic hazardous material feedstocks wherein organic products of decomposition of said materials are converted to less harmful inorganic materials. Thus the scope of the invention should be determined by the appended claims and their legal equivalents, rather than by the examples given.

What is claimed is:

1. A method of disposing of halogenated organic hazardous wastes utilizing said wastes to accomplish direct reduction of iron oxide in a closed pressurized reduction reactor comprising the steps of:

a) supplying said reactor with iron oxide as an iron source;

b) supplying a carbon and hydrogen containing, heated, reducing atmosphere by dissociating a short chain hydrocarbon by pyrolysis within the reactor;

c) operating the reactor until traces of iron oxide are reduced by said atmosphere to sponge iron and traces of sponge iron are carburized by said atmosphere to iron carbide then;

d) introducing into the reactor an alternate reductant supplanting said short chain hydrocarbon, said alternate reductant comprising organic hazardous wastes having associated polluting fractions comprising halogenated hydrocarbons;

e) dissociating by pyrolysis, said organic hazardous wastes having polluting fractions in the catalyzing presence of sponge iron, iron carbide and iron oxide in said closed pressurized reactor and of the resulting said carbon and hydrogen containing, heated, reducing atmosphere reducing additional iron oxide to sponge iron and carburizing additional sponge iron to inorganic iron carbide and producing resulting water and inorganic remnants of polluting fractions which are scrubbed from the reducing carburizing atmosphere.

2. The method of claim 1 wherein the reducing atmosphere is partially scrubbed of unwanted remnants of pyrolysis; soluble and condensed acid gases with condensed water vapor in the direct reduction water scrubbers.

3. The method of claim 2 wherein said unwanted remnants of pyrolysis are also partially removed by reaction with limestone admixed with the iron oxide feedstock.

4. The method of claim 2 wherein said unwanted remnants of pyrolysis are also partially removed in selective ion scrubbers.

* * * * *